United States Patent [19]

Nobles

[11] 4,044,820
[45] Aug. 30, 1977

[54] METHOD AND APPARATUS FOR PREHEATING COMBUSTION AIR WHILE COOLING A HOT PROCESS GAS

[75] Inventor: Elon J. Nobles, Minnetonka, Minn.

[73] Assignee: Econo-Therm Energy Systems Corporation, Minneapolis, Minn.

[21] Appl. No.: 689,126

[22] Filed: May 24, 1976

[51] Int. Cl.² ............... F28D 7/08; F28D 15/00
[52] U.S. Cl. .................................. 165/2; 165/66; 165/107; 165/DIG. 12; 34/86; 126/117; 237/55
[58] Field of Search .......... 165/107, DIG. 12, 66, 165/2, DIG. 2; 237/55; 126/117; 34/86

[56] References Cited

U.S. PATENT DOCUMENTS

| 2,854,220 | 9/1958 | Vaughan | 165/107 |
|---|---|---|---|
| 3,623,549 | 11/1971 | Smith, Jr. | 165/107 |
| 3,653,429 | 4/1972 | Lawrence | 165/107 X |
| 3,968,833 | 7/1976 | Strindehag et al. | 165/107 X |

FOREIGN PATENT DOCUMENTS

| 1,338,514 | 4/1962 | France | 165/107 |
|---|---|---|---|
| 187,553 | 12/1905 | Germany | 165/107 |
| 705,265 | 3/1954 | United Kingdom | 165/107 |

*Primary Examiner*—Carroll B. Dority, Jr.
*Assistant Examiner*—Sheldon Richter
*Attorney, Agent, or Firm*—Edward J. Cabic

[57] ABSTRACT

A heat transfer apparatus for cooling a hot process gas to a temperature close to its dew point without condensation. The hot gas passes through a first chamber while air to be heated passes in an adjacent second chamber. A series of fluid containing tubes extend back and forth between the two chambers. The fluid continuously flowing through the tubes extracts heat from the hot gas and transfers it to the air to be heated.

39 Claims, 17 Drawing Figures

COMMON
CROSS FLOW
EXCHANGE

COMMON HOT OIL
SYSTEM
(WITH SEPERATE COILS)

METHOD AND APPARATUS FOR PREHEATING COMBUSTION AIR WHILE COOLING A HOT PROCESS GAS

BACKGROUND OF THE INVENTION

1. Field of the Invention

The present invention relates to a method and apparatus to preheat combustion air while cooling a hot process gas such as flue gas close to its dew point without any condensation. A heat transfer element in the form of multiple tubes, a serpentine coil, or metal conduit extends between two adjacent chambers through which the air and process or flue gas pass. Heat is transferred from the hot process gas to a liquid flowing in the coil and this heat is then in turn transferred from the liquid to heat the air.

2. Description of the Prior Art

The simplest form of air preheater involves a conduit or plate section in which there is a cross flow allowing hot flue gas to preheat the air being fed into combustion. Such a simple system is shown in FIG. 1. In this method of transfer essentially bare surface is utilized as both flue gas and air are at essentially atmospheric pressure and have relatively low heat transfer coefficients. This is in contrast to the heat transfer situation in boiler water economizers where there is an opportunity to use an enhanced or extended surface such as by finned tubes. On the low pressure side, of an economizer the fins provided extra surface to match the high heat transfer coefficients on the liquid side. In normal air preheating situations such surface enhancement is not practical without extended surface on both low pressure flue gas and low pressure inlet air sides. Some forms of extension of both sides of transfer surfaces have been achieved. However, the extension ratio, which is the ratio of surface exposed to the fluid as compared to the base plate or tube area, is limited and the apparatus is expensive. Through the use of an intermediate transfer liquid in the invention it is possible to use an economic low cost extended transfer surface on both the cooled and heated sides.

By analysis of FIG. 1 there is a theoretical limit to a simple cross flow condition as the air cannot reach a preheated temperature level in excess of the lowest flue gas temperature level. This limits the amount of air preheat and limits the efficiency.

A second form of air preheater with an intermediate liquid utilizes separate heat recovery surfaces in the flue gas and in the air ducts, as shown in FIG. 2. This systems avoids the limitations of FIG. 1, but it is necessary to balance the flowing heat capacity of the circulating liquid exactly to that of the flowing gases. In this system all the heat is first taken up in the liquid stream and is then transferred in total to the heated air. Thus at point A in FIG. 2 a cool liquid contacts a cooled flue gas with a positive likelihood of condensation and active corrosion conditions existing.

The Smith U.S. Pat. No. 3,623,549 discloses a heat exchange apparatus in which heat is absorbed in a liquid from a hot gas in one location and is transferred to relatively cool gas in a spaced apart second location. There are two or more separate heat transfer circuits between the hot gas and the cold gas. After the liquid has its temperature increased in the hot gas section, the liquid makes only one pass to the cool gas zone where it will give up its heat so that the liquid temperature decreases. Each conduit is completely independent of the other circuits, and each circuit is required to use a different heat transfer fluid. Furthermore, each time the heat transfer liquid passes from the hot zone to the cool zone a pump is required.

German Pat. No. 187,553 discloses a single heat transfer tube coiled back and forth between a cold gas zone on one side and a hot gas zone on the other side. There is a pump means with a cylinder of such capacity that each stroke displaces the heat transfer fluid in the tube from one side. On the return stroke, the fluid returns to its original position. This back and forth motion of the same fluid within the single tube does not permit the fluid to continuously flow in one direction completely through the apparatus.

SUMMARY OF THE INVENTION

In order to obtain a more effective heat transfer with greater efficiency it has been found that the heat can be transferred between countercurrently flowing hot flue gas and ambient inlet combustion air by arranging a multiple array of tubes passing directly between the cooled and heated zones with a heat transfer liquid flowing through the tubes. The heat absorbed by the heat transfer liquid at each level of the flue gas is then directly transferred to the combustion air at the adjacent level. As a result, a closer approach to countercurrent heat exchange is obtained with simple, uncomplicated equipment. The temperature level or "thermodynamic availability of heat" is preserved with the highest level BTU's from flue gas being transferred to the highest level use in the preheated air. The amount of heat transferred in each passage or level is small leading to a nearly constant liquid temperature. This essentially constant and controllable liquid temperature permits working close to condensation temperature without danger of condensation. The apparatus can be used in many applications where it is desired to cool a gas close to its dew point while insuring that the gas temperature does not go to or below the dew point temperature causing condensation on exchange surfaces.

DESCRIPTION OF THE PREFERRED EMBODIMENTS

Figure 1:
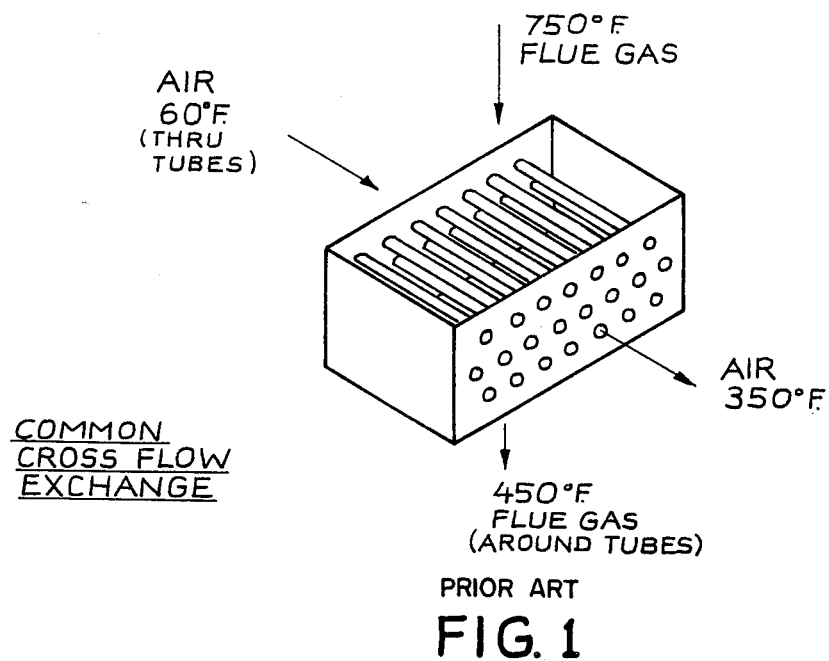
FIG. 1 is the prior art cross flow heat exchange.
Figure 2:
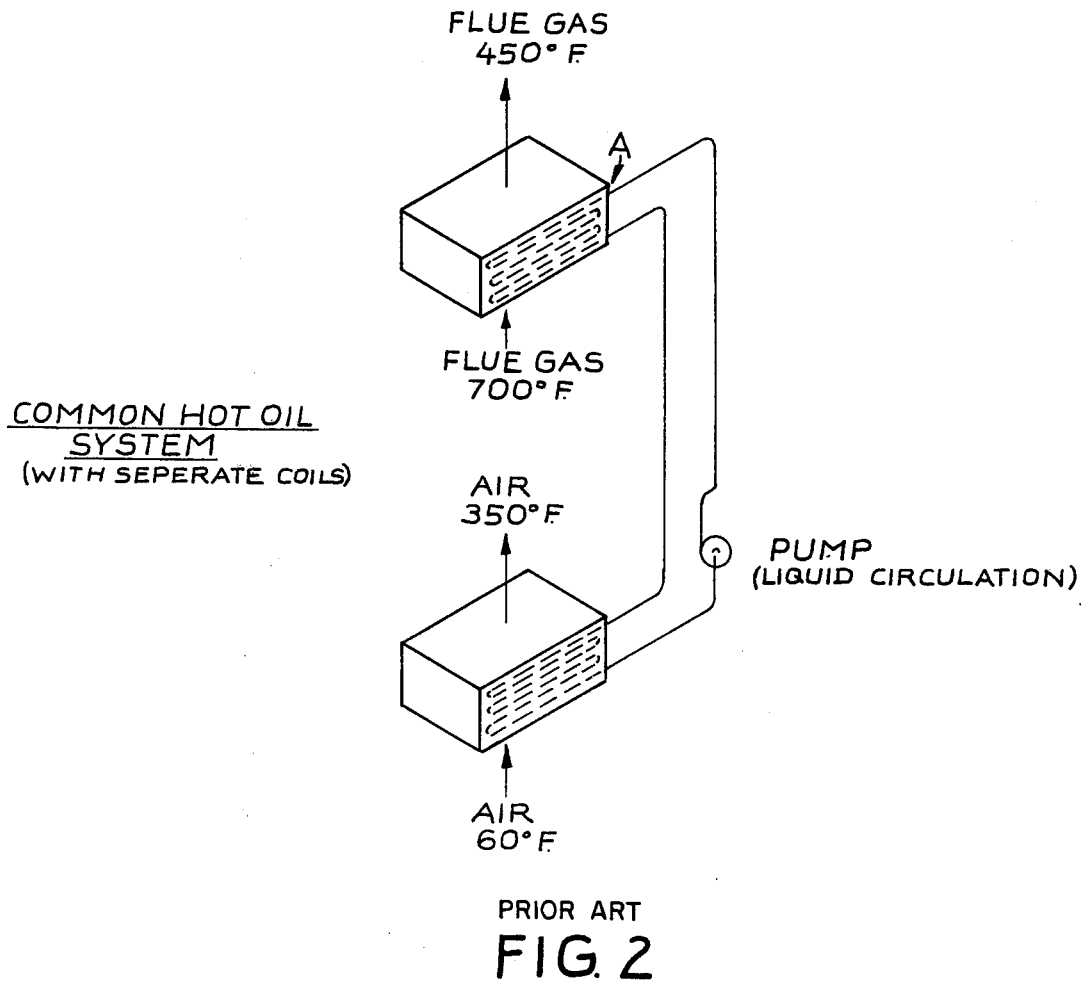
FIG. 2 is a prior art hot oil system with separate coils.
Figure 3:
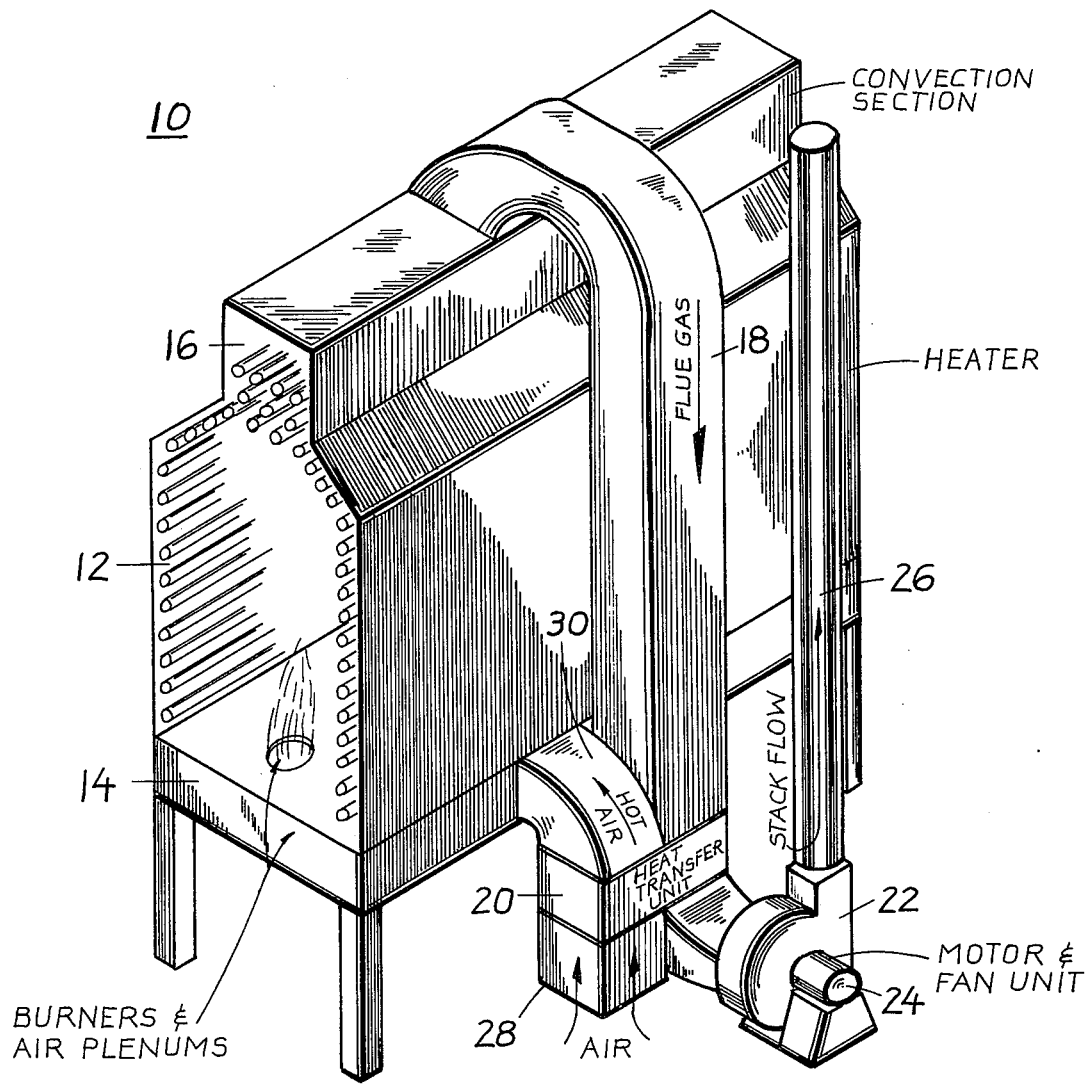
FIG. 3 is a horizontal fired process heater.

A typical application of the invention is in a horizontal fired process heater as shown in FIG. 3. The complete unit identified as 10 consists of a heater radiant section 12 with burners and air pleniums 14. The gas from the radiant section passes upward through the convection section 16 and leaves through flue gas duct 18 and passes to the heat transfer unit 20. The cooled flue gas then passes through exhaust fan 22 located at the ground level and powered by driver 24. The exhaust gas is discharged upward through the stack 26. The flue gas leaving the convection section can be in the temperature range of 400° to 1100° F and the temperature can be lowered to a value from about 200° to 500° F depending on the condensation level.

The incoming air for the burner enters through inlet duct 28 and passes through the heat transfer unit 20 where it is heated from ambient temperature to a temperature of about 300° F up to 700° F. It is then fed into a plenum below the burners 14 which also serves as a silencer. For draft balance a forced draft fan may be employed on air ahead of heat transfer unit 20.

This heat transfer apparatus can be located at the top of the unit as well as the bottom although there are definite operational advantages to having the unit on the ground. The first advantage in the heat transfer equipment is fully accessible at the ground level at all times. Secondly, the fan furnishing the mechanical draft either on a forced draft or an induced draft basis is located on a firm foundation which is fully accessible to operating personnel. This obviates any vibration transmission to the attached heating structure and serves to eliminate any operating platforms with attendant painting and maintenance requirements. Finally by drawing the flue gases down to the ground level a seal is provided in the flue gas circuit which on shutdown restricts the natural draft and holds the heater temperature reasonably constant. This serves to moderate the quick chilling effect which is associated with shutdown under conventional, natural draft conditions. As a result the mechanical draft provides a smaller stack, a smaller flue gas duct and a much smaller convection section with conversely greater capacity for the same section while providing certain economies in radiant design.

Figure 4:
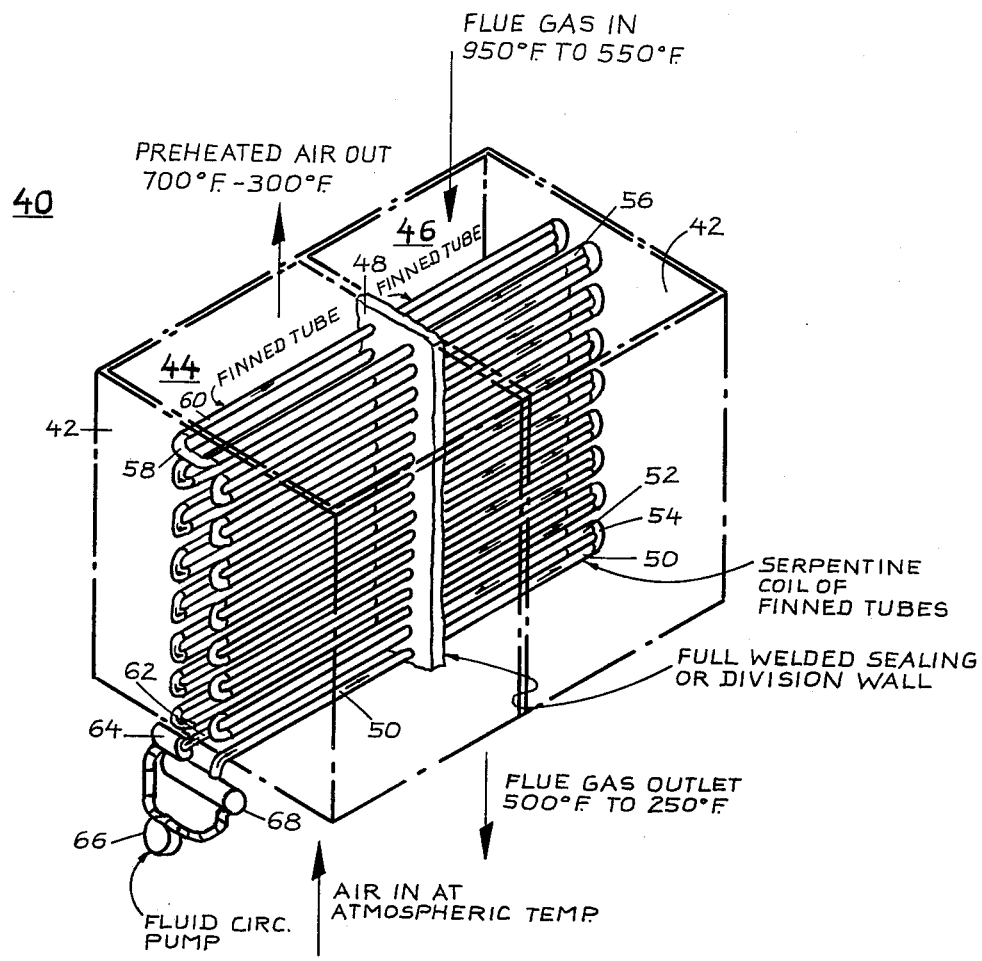
FIG. 4 is an embodiment of the present invention having two parallel sets of tubes.

The heat transfer unit is shown in further detail in FIG. 4 where the unit 40 consists of walls 42 forming a preheated air zone in chamber 44 and a flue gas zone in chamber 46. The two zones are thermally separated by a dividing wall 48. The first inlet tube 50 is shown passing across the air inlet zone through the wall 48 and through the flue gas zone where it is connected to an adjacent, parallel spaced tube 52 by elbow 54. The tube is sealed to the wall 48 through which it passes so there is no leakage of cool air into the flue gas zone.

As shown in FIG. 4 there can be, for example, 16 tubes arranged one above the other and connected together to form the upwardly flowing path for the heat transfer oil. At the top of the unit the uppermost tube 56 on this upflowing side is connected by elbow 58 to a parallel set of tubes 60 which allow the fluid to flow downwardly, in a serpentine manner to bottom tube 62 which feeds into a return header 64. The liquid from the return header 64 flows to a fluid circulation pump 66 where it is pumped up into the inlet header 68 to begin its cycle once again.

FIG. 4 illustrates one of these units having two parallel sets of tubes, one for upwardly flowing fluid and an acjacent parallel set for the downwardly returning liquid. Each of these pairs of tubes can be connected along the inlet header 68 and the return header 64 to form a plurality of the finned tube units.

Although finning on the liquid conduits is not always necessary, better heat transfer is obtained by increasing the external surface with the use of fins. Preferred finned extension ratios can vary from 1.5 to 9.0.

To transfer the heat through the flue gas and the air a heat transfer fluid flows through the tubes. Parallel pumps are arranged to force the liquid at a good velocity through the tubes to obtain an efficient heat transfer system. As shown in FIG. 4, all of the pumping is done on the cool transfer medium at the bottom of the unit by simple, reliable centrifical equipment. As a result of this arrangement, overall countercurrent transfer can be achieved with specific exchange at a number of levels shown in FIG. 4. The tubes are sealed to the wall 48 providing complete isolation of the flue gas and the air so as to avoid any leakage between the two zones with its attendant condensation corrosion. The wall 48 is insulated on the air side. This prevents the incoming cool air from cooling the wall to such an unacceptable degree that the temperature on the flue gas side of the wall would be lower than the dew point condensation temperature of the flue gas.

The heat transfer fluid is selected so that its point of thermal degradation is at least 30°-40° F above the average operating fluid temperature. Examples of suitable fluids include the Dowtherms made by Dow Chemical, the Therminols made by Monsanto, the heat transfer coils made by various oil companies and water.

Figure 5:
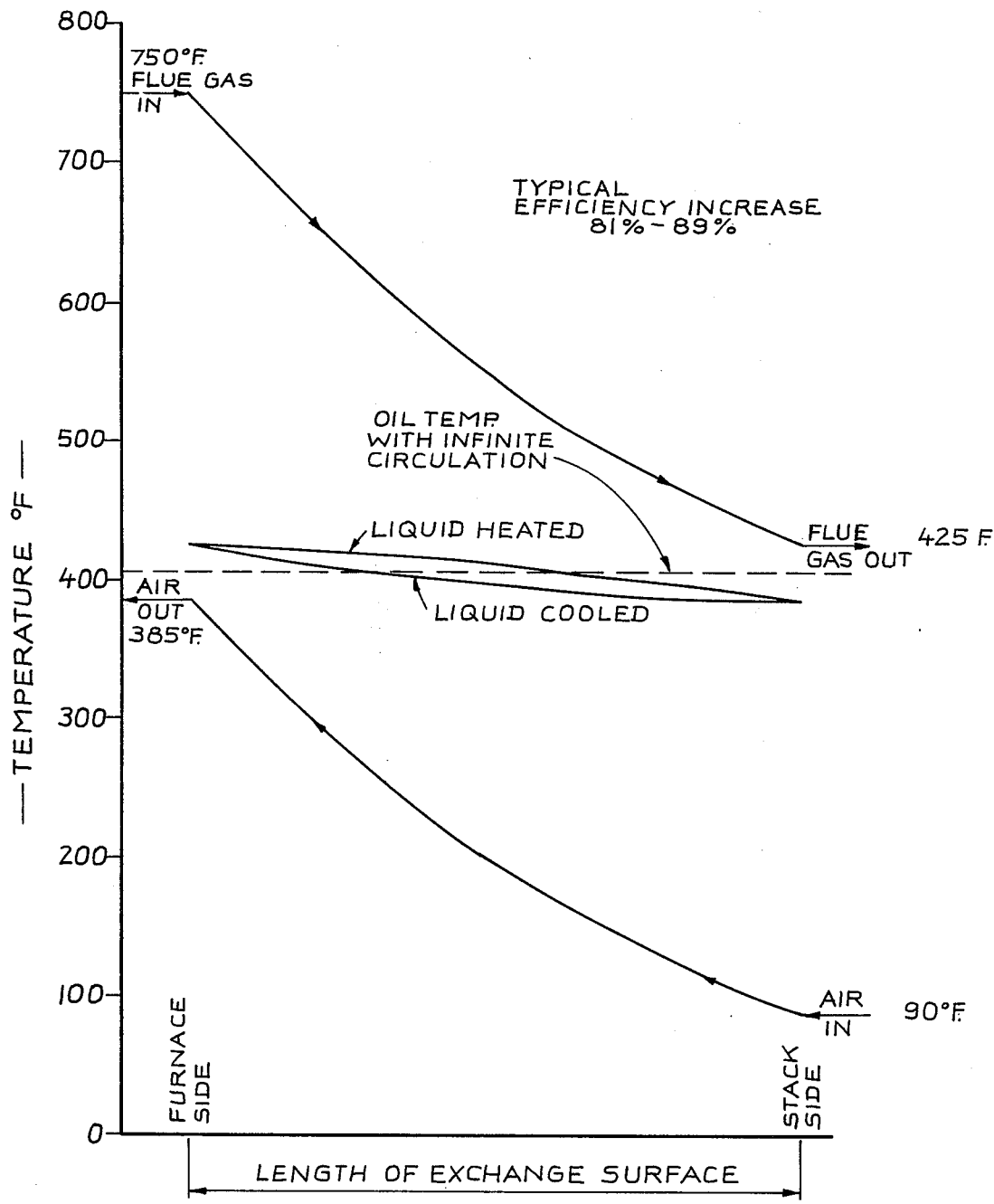
FIG. 5 is a temperature graph of a single zone heat exchange according to the present invention.

The temperature characteristics for a typical single zone heat exchange is shown in FIG. 5. There the flue gas enters at a temperature of approximately 750° F and exits at a temperature of approximately 425° F. At the same time the ambient inlet air at a temperature of about 70° F is heated to a temperature of about 385° F. As shown in the diagram there is approximately a mean thermal difference of 176° F between the air and the heat transfer liquid while the mean thermal difference between the flue gas and the liquid is approximately 157° F. The dotted line in FIG. 5 represents the theoretical oil temperature that would be obtained with infinite circulation and the two solid lines show the cooled liquid and the heated liquid temperatures as are obtained under normal operation.

The liquid temperature is maintained at the desired level above the dew point of the hot gas by controlling the amount of air which passes through the air zone. As more air flows through the air zone it can absorb more heat from the heat transfer liquid which will lower the temperature of the liquid. The apparatus can either be initially designed to provide the proper flow rates for air and gas or a by-pass for the air zone can be provided with means to control the amount of incoming air that is to flow through the air zone with the remainder flowing through the by-pass. The temperature of the fluid tends to remain constant due to the large heat capacity of the fluid as compared to the heat capacity of the two gases. An advantage of the present device is that by having a nearly constant fluid temperature, the system can be operated at a temperature very close to the dew point temperature of the hot gas without causing any condensation.

Figure 6:
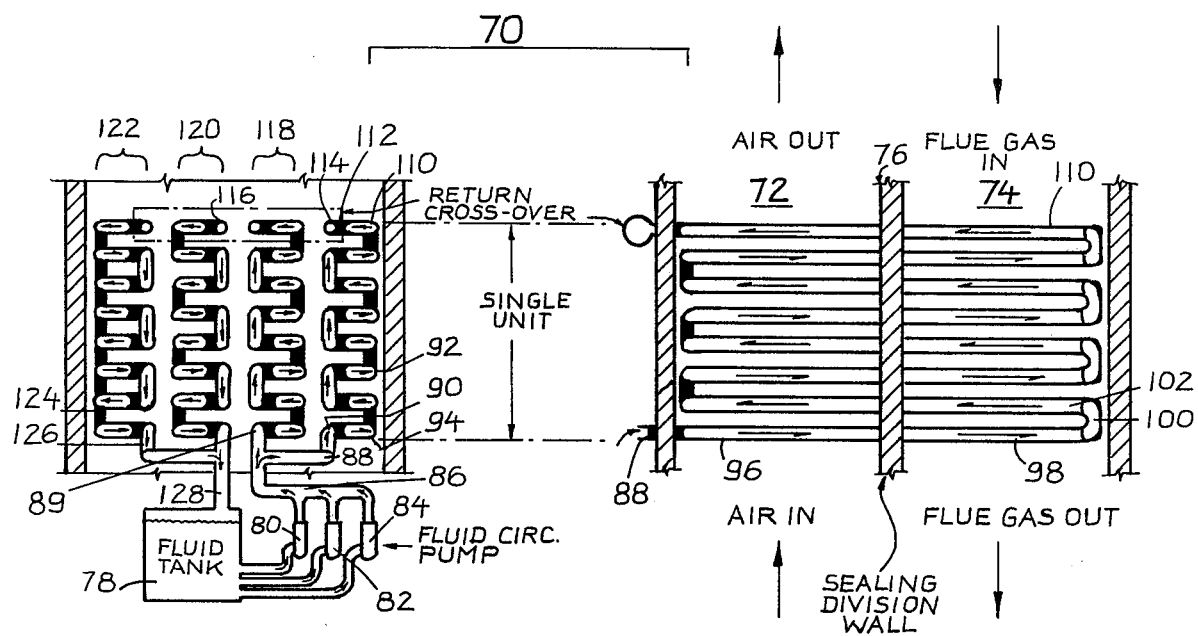
FIG. 6 is a single zone heat exchanger according to the present invention.

FIG. 6 illustrates a multicomponent single zone heat exchange made of two parallel units flowing upwardly and two parallel downward return units in which each unit has three parallel tubes at each vertical level.

The heat transfer fluid is stored in tank 78 and is pumped by one, two or three of the three pumps 80, 82 and 84 to a common header 86 which feeds into the first unit by line 88 and into the second unit by line 89. In the first unit the fluid initially flows through the air side and then into the flue gas side in long straight tube 90. At the end of the tube 90 in the flue gas zone a horizontal return bend conducts the fluid to a return middle tube 92. At the front end a second horizontal return bend conducts the fluid back again through tube 94. This tube 94 returns the fluid to the back portion of the device and consists of a finned tube 96 in the air chamber and finned tube 98 in the flue gas chamber. A vertical elbow 100 connects the tube 98 to the vertically adjacent tube 102. The tube arrangement continues in this serpentine fashion back and forth through the flue gas chamber 74 and the air chamber 72. In each instance where the tube passes through the sealing division wall 76 it is sealed to the wall such as by welding. At the top of the exchanger the uppermost tube 110 is connected by a horizontal elbow to middle tube 112 which in turn is connected at the opposite end by a second horizontal elbow to the third tube 114. The fluid in tube 114 then flows into a return crossover header 116.

In a similar manner the fluid flowing in the parallel second unit 118 from the inlet line 89 leaves the unit and flows into the return crossover. The fluid in the return crossover 116 then proceeds downwardly through the two parallel units 120 and 122. Again the fluid flows through three tubes in each horizontal level of each unit which can be connected by elbows and it then drops down to the next lower level where it again flows back and forth between the air and flue zones through the three longitudinal tubes. After the fluid passes concurrently through both units 120 and 122 it is collected in outlet lines 124 and 126 which in turn carry the liquid through a common pipe 128 back to the fluid tank 78 for recirculation.

Figure 7:
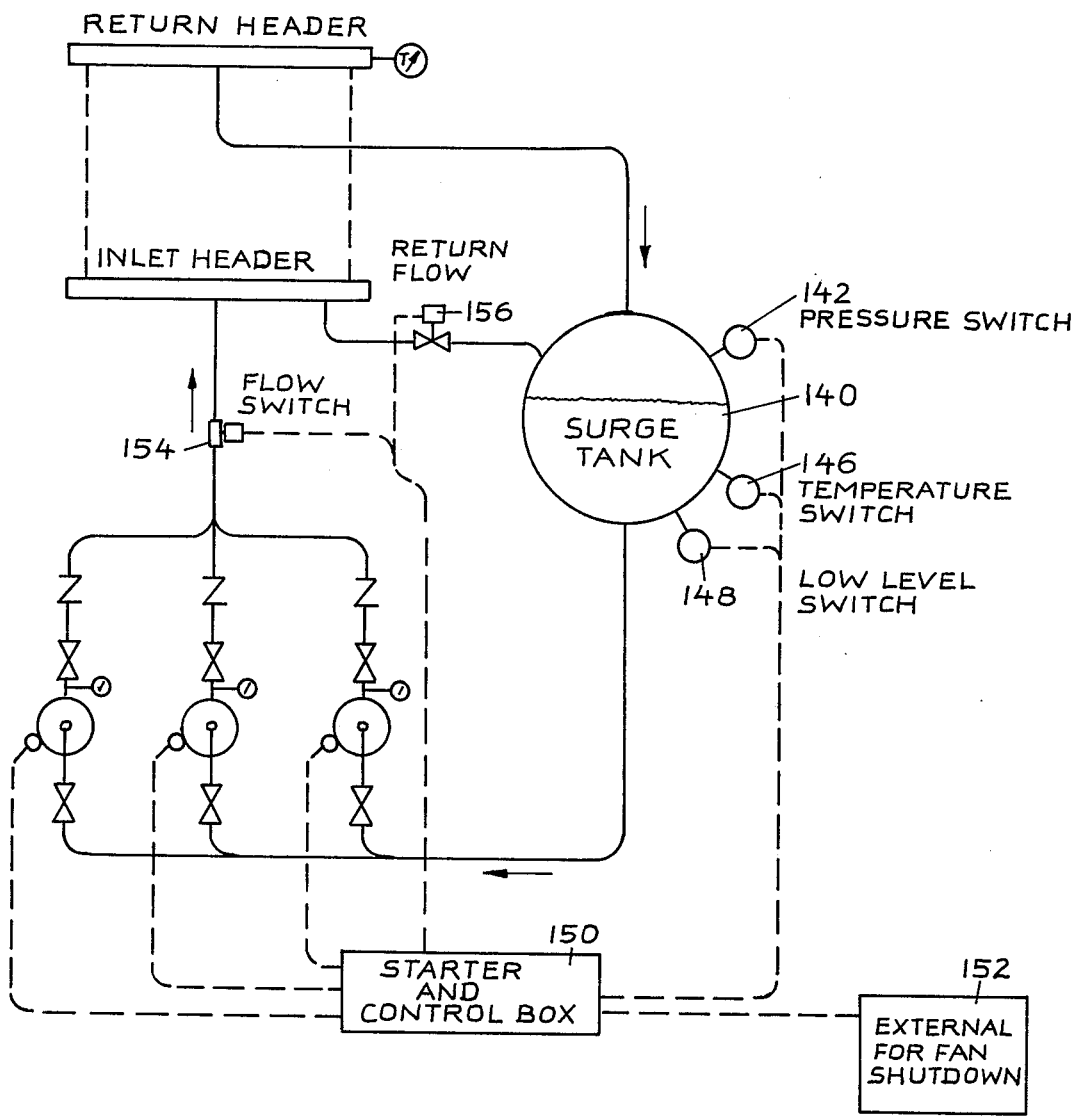
FIG. 7 is a schematic diagram of controls for the present system.

FIG. 7 represents a schematic diagram of a possible control system for a simplified unit. The surge tank has a sufficient volume to accommodate all of the liquid in the circulating units and all possible liquid expansion. Thus in case the temperature in the hot gas side becomes too hot, the heat transfer fluid can be drained from the tubes so that carbonization of the fluid will not occur. It also provides for a flooded suction condition for the circulation pumps.

The surge tank can also be provided with heaters for use in cold climates so that as the unit is placed in operation the temperature of the fluid will not be below the dew point of the hot gas and thus condensation will not occur.

The simple centrifugal pumps which are preferably one and a spare in number are arranged in a parallel manner to circulate either oil, water or any other heat transfer liquid which is used to maintain heat transfer inside the multiple heat transfer tubes running between the inlet header and the return header. The liquid flows freely by gravity from the return header back to the surge tank. Upon shutdown, a solenoid valve 156 can open to drain the inlet header also by gravity to the surge tank.

An electrical starter control system using simple, primary elements measures adverse conditions to automatically shutdown the system. Among the parameters which can be measured is the flow of liquid passing through the coils. If the flow drops below a minimum level as measured by detector 154 the system stops. If there is electrical failure in all of the operating pumps this can also close down the circuit. A measuring device 146 on the surge tank measures the temperature and in the event it is too high or too low the system can be shut down. Similarly pressure switch 142 detects pressures which are too high and low level switch 148 detects an unreasonable low level in the surge tank. An additional detector can be used to determine if the flue gas inlet temperature is too high. Switch 152 serves as a switch to control the external draft fan. Other controls can be added as desired.

Figure 8:
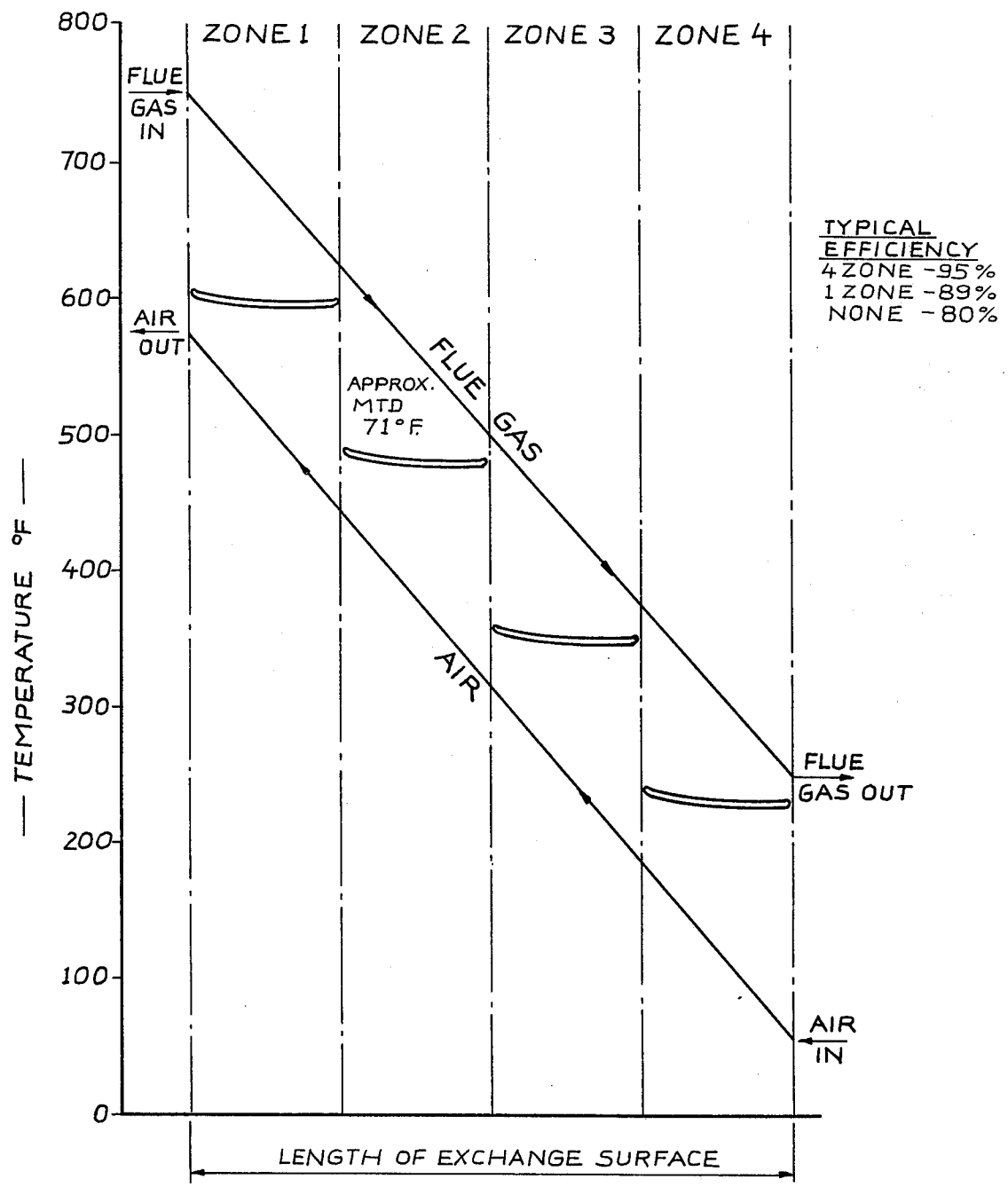
FIG. 8 is a temperature graph for a multi-zone heat exchange.

The heat transfer system can be divided into separate zones. As shown in FIG. 8, by having four separate fluid circulation zones the air temperature can be raised to a level of about 550° F and the fired heater efficiency can be increased from an efficiency of 89% when a one zone unit is used to an efficiency of 95% when the four zone units are employed. With four stages the mean thermal difference between the liquid, and the air or flue gas is also reduced to approximately 71° F and as a result much more surface in design will be required.

Figure 9:
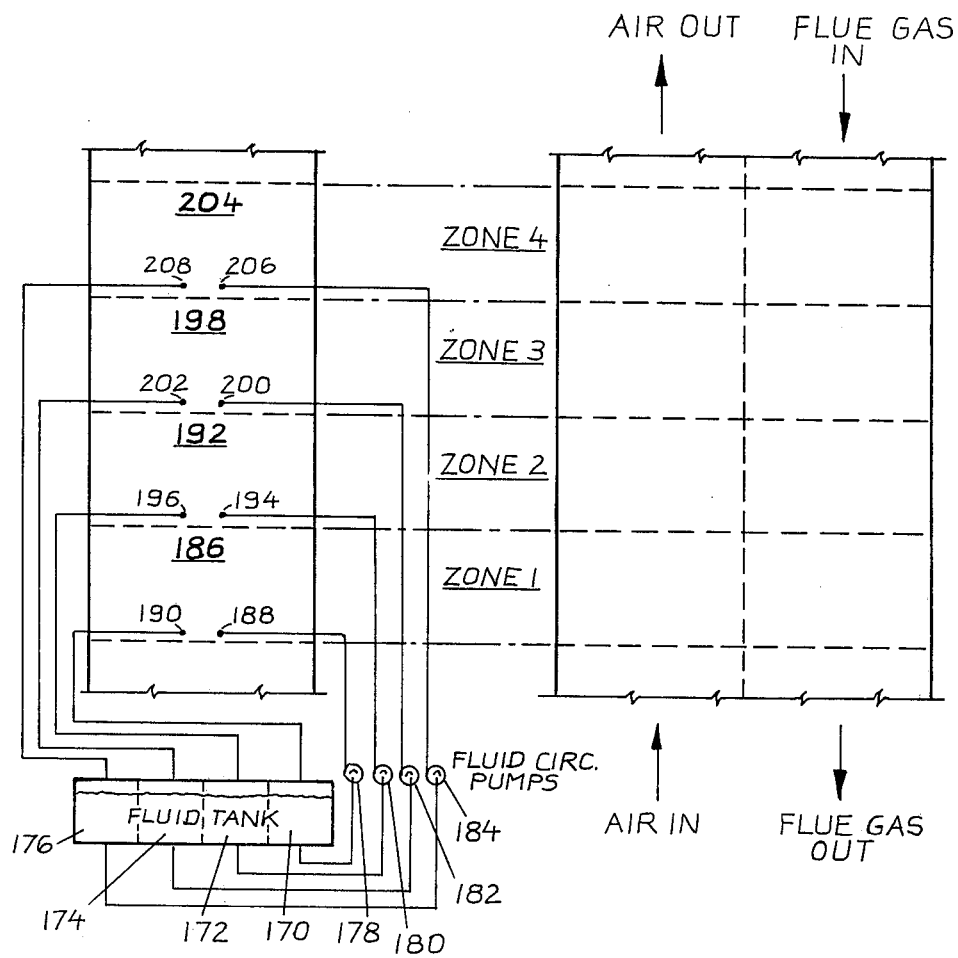
FIG. 9 is a piping diagram for a multi-zone heat exchanger.

FIG. 9 illustrates an embodiment of the invention having the multi-zone heat exchanger unit. The fluid tank is divided into four separate chambers with each chamber holding liquid at a different temperature. The first tank 170 is connected by preferably two operating fluid circulating pumps designated as 178 which pump the fluid to inlet header 188 in the first zone 1 designated 186. After passing back and forth through the serpentine coils between the air chamber and the flue gas chamber the fluid finally returns to the return header 190 and back to the tank 170. In a similar manner the second tank 172 is connected to circulating pumps 180 which pump the fluid to inlet header 194 of zone 2 designated 192 and the fluid returns via return header 196 to the tank. The fluid in tank 172 is warmer than that in tank 170. The third zone is supplied with fluid from tank 194 via pumps 182 to the inlet 200 where the liquid flows again through the unit in zone 3 designated 198 and finally exits through line 202 back to the tank. Again the fluid in tank 174 is warmer than that in tank 172. Finally, the fourth unit has the hottest fluid in tank 176 which is pumped by the fluid circulating pumps 184 to the inlet header 206 in section 204 which constitutes zone 4. The liquid returns via tube 208 back to the tank 176.

Figure 10:
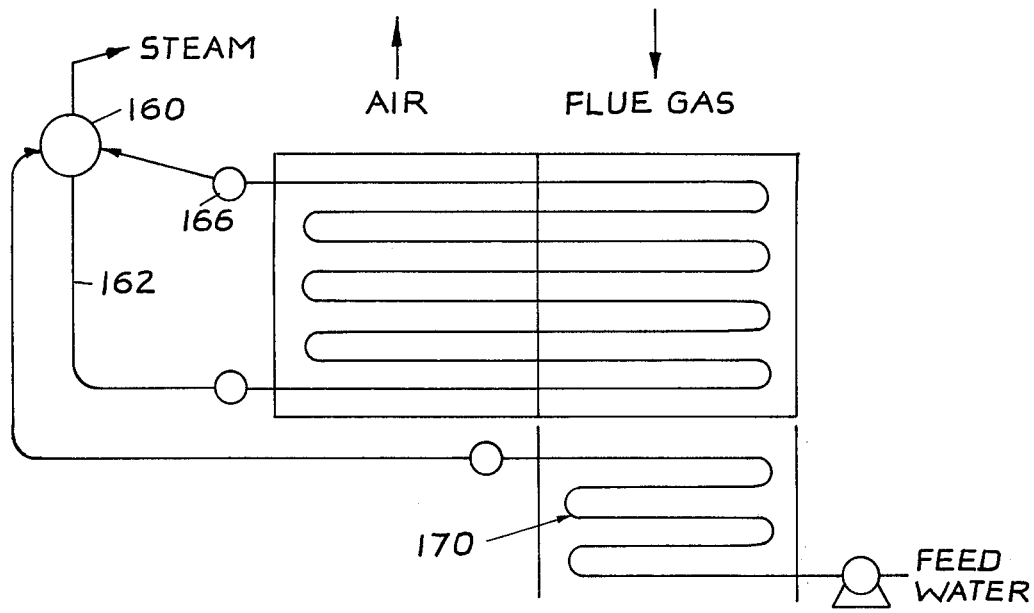
FIG. 10 is an embodiment using boiler feed water as the heat transfer fluid.

Further embodiments of the invention include using as the circulating heat fluid, boiler water. As shown in FIG. 10 the water in boiler drum 160 flows down pipe 162 by gravity and through the heat transfer unit. The water with vaporized steam continues to flow upwardly to the return header 166 and back into the boiler drum. As a result of the gravity feed, the water continually flows through the heat transfer device. The water being fed into the boiler can first pass through separate heat exchanger 170 to initially heat the boiler feedwater with the residual heat remaining in the flue gas that leaves the main heat transfer unit.

Figure 11:
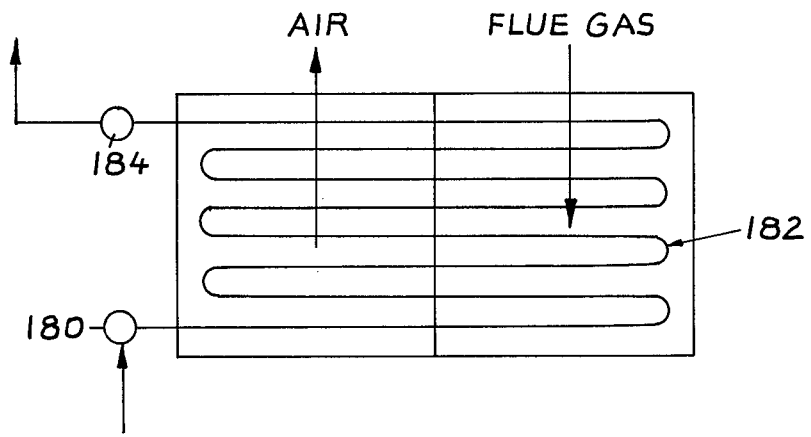
FIG. 11 illustrates an embodiment where the heat transfer fluid makes a single pass through the apparatus.

In addition to recirculating the heat transfer fluid as shown in the earlier embodiments, a fluid may be used which only passes through the unit a single time such as in the embodiment shown in FIG. 11. There a process fluid enters inlet 180, passes through the heat exchange coils 182 and leaves through outlet header 184 where it can then be sent to a main heater for further heating and use in a process. An example of such a fluid is oil which is being treated in a refinery.

Figure 12:
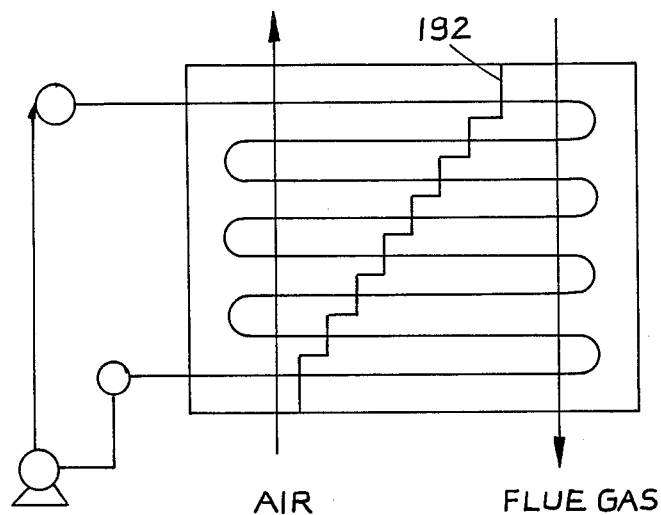
FIG. 12 illustrates an embodiment having a staggered wall between the two heat transfer zones.

In the previous embodiments the wall between the flue gas zone and the combustion air zone has been a straight vertical member with the heat transfer tubes being of equal lengths on either side. A better overall balanced heat exchange area can be obtained by using a staggered or sloped wall 192 as shown in FIG. 12. A large heat transfer surface area is provided for air being heated at the top section of the device and a corresponding large surface area is provided for the flue gas as it is being cooled in the lower section of the device. The net result is a balanced heat exchange area for both the air and the flue gas and constant liquid temperature. This staggered configuration exposes the air leaving the heater to the largest surface area so the maximum amount of heat is supplied to heat the air to the highest possible temperature. Similarly since it is desired to cool the flue gas to its lowest temperature, the bottom portion of the device has the greatest surface area in contact with the flue gas to extract the maximum amount of heat.

Figure 13:
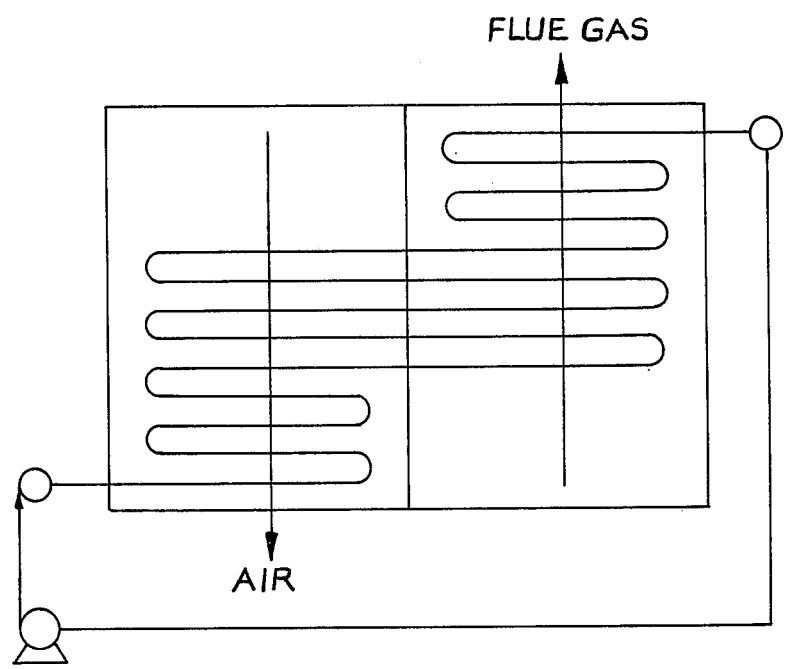
FIG. 13 illustrates an embodiment having additional heat transfer surface in one section of a heat transfer zone.

An alternative method to obtain an increased heat transfer surface is in one section of the flue gas zone or the combustion air zone as shown in FIG. 13. Instead of using a staggered vertical wall extra coils are provided in different parts of each of the zones. In the embodiment shown in FIG. 13 the extra coils are placed in contact with the hot entering flue gas.

Figure 14:
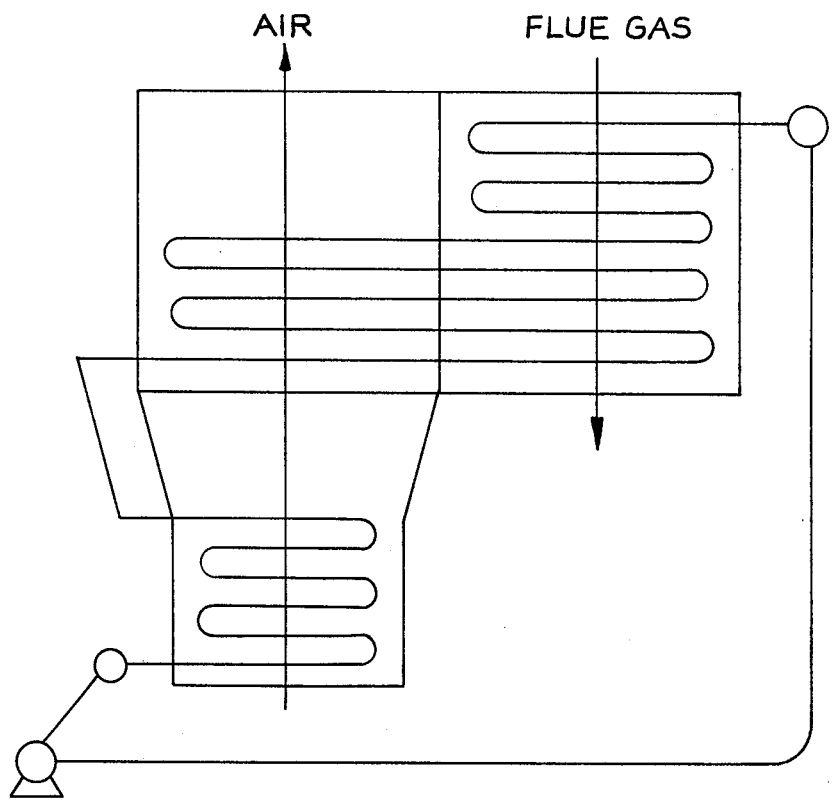
FIG. 14 illustrates an embodiment having extra coils in a detached section of the unit.

FIG. 14 presents a variation of the embodiment shown in FIG. 13 where the extra coils on the air side can be placed in a separate, detached unit from the main heat transfer area. The advantage of this configuration is that the empty bottom space on the flue gas side as shown in FIG. 13 is avoided and thus the heat transfer chamber can be built in a smaller size. Since there will be less expensive high temperature resistant materials to build the smaller unit, it will be more economical.

Figure 15:
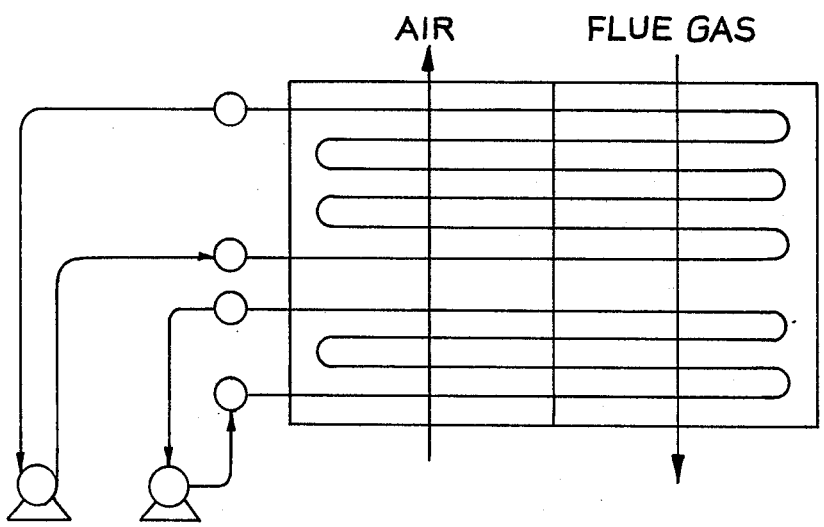
FIG. 15 illustrates a multi-stage embodiment having different surface areas in each section.

When employing the multi-stage embodiments, it is not always necessary to have equal surface areas for the heat transfer tubes in each zone. For example, as shown in FIG. 15 it is possible to have a top upper zone with a larger surface area than the lower zone.

In these drawings the number of coils shown in each zone is only schematic and it does not necessarily represent the quantitative amount of surface area. Even with the configurations shown, the surface area can be significantly changed by adding various amounts of finning to different parts of the apparatus.

Figure 16:
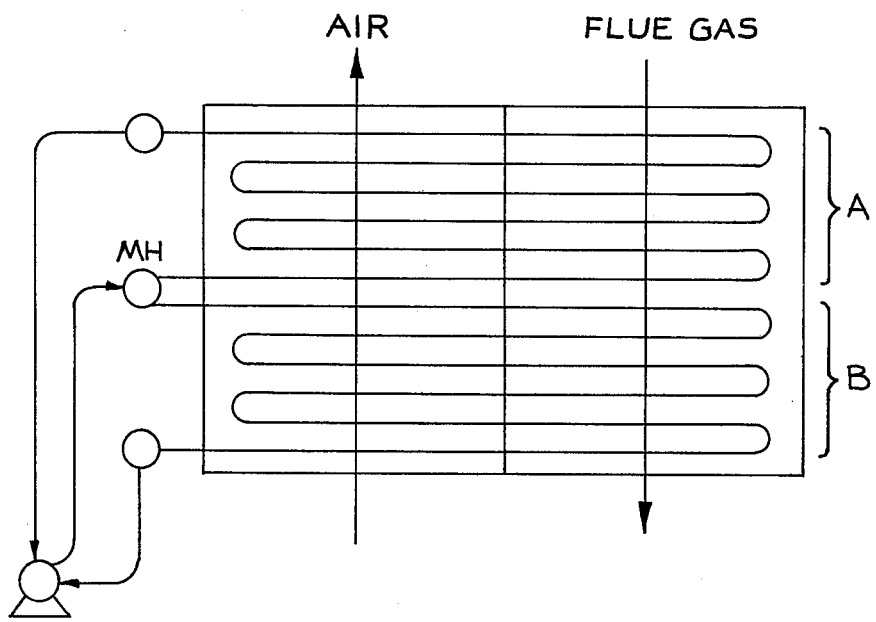
FIG. 16 illustrates a multi-zone embodiment having a single pump.

For the multi-zone embodiments the number of pumps required can be reduced by the configuration in FIG. 16. There a single pump or a single series of pumps supplies the liquid up to the same middle header MH which feeds a first upper zone A while at the same time feeding the liquid into the second lower zone B. This arrangement allows one pump or a connected series of pumps to supply fluid to two different zones. The fluid in each zone will be heated to a different temperature.

Figure 17:
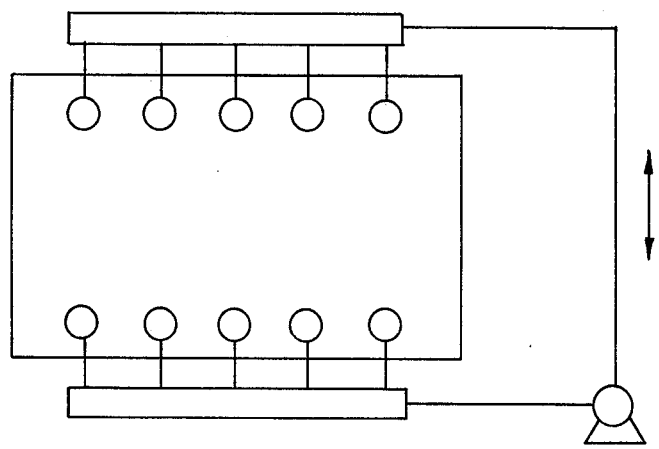
FIG. 17 illustrates an embodiment where the heat transfer fluid flows in parallel units from the top of the unit to the bottom of the unit or vice versa.

FIG. 17 is an end view of an embodiment where all of the liquid is pumped to a horizontal header connected to the top pipes and allowed to flow down the serpentine coils to a second horizontal header at the bottom. Alternatively the fluid can be pumped to all of the bottom pipes and allowed to flow upwardly to the top. In this embodiment all of the fluid flowing in all of the parallel serpentine coils is flowing in the same longitudinal direction. A further modification of this embodiment is to arrange the two inlet and outlet headers vertically with each serpentine coil in a horizontal plane connected at opposite ends to each header.

What is claimed is:

1. A method for cooling a hot gas close to its dew point without causing condensation comprising
    flowing air through a first chamber while flowing the hot gas to be cooled through a second chamber which is separated from the first chamber by a common wall, and
    continuously flowing a heat transfer fluid having a high heat capacity as compared to said hot gas through the inlet end of heat transfer tubes which extend back and forth between the two chambers through said common wall in a serpentine path between the two chambers which extends in one direction and out the outlet end of the tubes at the opposite end of said serpentine path, whereby the heat which is adsorbed by the heat transfer fluid in each section of the tubes in the hot gas chamber is directly transferred to the air as the heat transfer fluid advances through the tubes in the first air chamber.

2. A method according to claim 1, wherein the amount of air flowing through said first chamber is regulated so the temperature of said heat transfer fluid is above the dew point of said hot gas.

3. A method according to claim 1, wherein a pump is positioned outside the two chambers to flow the fluid through said tubes and said tubes in the serpentine path pass back and forth through said common wall within said two adjacent chambers without passing through a pump.

4. A method for heating combustion air while cooling a hot process gas close to its dew point comprising
    flowing air to be preheated through a first chamber while flowing the hot process gas through a second chamber which is separated from the first chamber by a common wall, and
    continuously flowing a heat transfer fluid having a high heat capacity as compared to said hot gas through the inlet end of heat transfer tubes which extend back and forth between the two chambers through said common wall in a serpentine path between the two chambers which extend in one direction and out the outlet end of the tubes at the opposite end of said serpentine path, whereby the heat which is adsorbed, by the heat transfer fluid in each section of the tubes in the hot gas chamber is directly transferred to the air as the heat transfer fluid advances through the tubes in the first air chamber.

5. A heat transfer apparatus for heating combustion air while cooling a hot process gas close to its dew point comprising
    a first chamber defining a combustion air zone through which air to be heated flows in a first direction along the longitudinal axis of the apparatus;
    a second chamber adjacent said first chamber defining a process gas zone through which heated process gas flows in a second direction parallel to the longitudinal axis and opposite to said first direction;

a common wall between said two chambers thermally separating said combustion air zone and said process gas zone;

hollow conduit heat transfer means extending through said common wall and bending back and forth between said two zones to form at least one serpentine coil extending in one direction;

an inlet header at one end of said serpentine coil;

an outlet header at the opposite end of said serpentine coil; and means to continuously circulate a heat transfer fluid through said inlet header, said heat transfer means between said two zones, and said outlet header, whereby the heat adsorbed by said fluid in the hot process gas zone is transferred to said combustion air.

6. A heat transfer apparatus according to claim 5, wherein said circulating means comprises a fluid tank and at least one fluid circulating pump in fluid connection with said outlet header and said inlet header.

7. A heat transfer apparatus according to claim 3, wherein said serpentine coil comprises a series of multiple connected parallel tubes at adjacent longitudinal levels in the apparatus each passing through said common wall so as to extend into said first and said second chambers,
   a. one end of a first tube being connected at a first longitudinal level to said inlet header,
   b. the opposite end of said first tube being connected by a U-shaped connected means to the adjacent end of a second tube at the same level,
   c. the construction in part (b) being repeated until reaching the last tube at the first longitudinal level, and
   d. the opposite end of the last tube at the first longitudinal level connected by a U-shaped connecting means in a longitudinal direction to a first tube at the next level of the adjacent set of multiple parallel tubes where said tubes are similarly connected.

8. A heat transfer apparatus according to claim 5, wherein said heat transfer means is divided into separate zones along the longitudinal axis with an independent serpentine coil in each zone.

9. A heat transfer apparatus according to claim 8, wherein said means to circulate comprises at least one pump means for each zone.

10. A heat transfer apparatus according to claim 8, wherein said means to circulate comprises pump means for each zone and a fluid holding tank for the fluid circulating in each zone.

11. A heat transfer apparatus according to claim 8, having two zones and further comprising
   an outlet header for each of the serpentine coils in the two zones,
   a common middle inlet header connected to the inlet of each of said serpentine coils, and
   a common pump means in fluid connection with said middle inlet header whereby said fluid is pumped to said middle header and proceeds through said two independent zones and returns through the two outlet headers for recycle back to the pump.

12. A heat transfer apparatus according to claim 11, further comprising a fluid holding tank in fluid connection between said outlet headers and said pump.

13. A heat transfer apparatus according to claim 5, wherein said means to circulate comprises at least one pump.

14. A heat transfer apparatus according to claim 13 wherein
   said inlet header is connected to the output of said pump,
   said outlet header is in fluid connection with the input of said pump, and further comprising
   a plurality of serpentine coils passing back and forth between said two zones connected at one end to said inlet header and at the other end to said outlet header.

15. A heat transfer apparatus according to claim 14, wherein each serpentine coil is connected at one end to said inlet header, extends in a longitudinal direction and is connected at its opposite end to said outlet header.

16. A heat transfer apparatus according to claim 14, wherein each serpentine coil is connected at one end to said inlet header, extends in a direction transverse to said longitudinal axis and is connected at its opposite end to said outlet header.

17. A heat transfer apparatus according to claim 5, wherein said means to circulate is a boiler drum positioned above the heat transfer apparatus to permit the boiler water to flow by gravity through the heat transfer means and return to said boiler.

18. A heat transfer apparatus according to claim 17, further comprising means to preheat the water being fed to said boiler in the form of boiler water heat transfer tubes in said second chamber through which said boiler feed water flows and becomes heated prior to entering said boiler.

19. A heat transfer apparatus according to claim 18, wherein said boiler water heat transfer tubes are positioned at a point downstream from said hollow conduit heat transfer means.

20. A heat transfer apparatus according to claim 5, wherein said serpentine coil has an outer finned surface to increase the heat transfer surface area.

21. A heat transfer apparatus according to claim 20, wherein the extension ratio of the finned surface to the nonfinned tube areas is from about 1.5 to 9.0.

22. A heat transfer apparatus according to claim 5, wherein said serpentine coil consists of straight lengths of tube extending through said common wall in a direction perpendicular to said wall with the ends of each longitudinally spaced apart pair of tubes being joined by an elbow.

23. A heat transfer apparatus according to claim 22, wherein said tubes are finned tubes having an increased heat transfer surface area.

24. A heat transfer apparatus according to claim 23, wherein the extension ratio of the finned surface to the nonfinned tube areas is from about 1.5 to 9.0.

25. A heat transfer apparatus according to claim 5, wherein said common wall extends in a vertical direction and has a staggered configuration so that at one longitudinal end of the wall the first chamber is larger than the second chamber while at the opposite longitudinal end of the wall the second chamber is larger than the first chamber.

26. A heat transfer apparatus according to claim 25, wherein said second chamber defining a process gas zone is larger at its entrance where the heated process gas enters the chamber than the adjacent first chamber and wherein said first chamber air at the opposite end is larger than the adjacent second chamber.

27. A heat transfer apparatus according to claim 5, wherein in one cross-sectional zone defined by two points on the longitudinal axis of the apparatus, there exists a greater heat transfer surface in one chamber than in the adjacent chamber.

28. A heat transfer apparatus according to claim 27, wherein the additional heat transfer surface is obtained by providing a greater number of heat transfer coils in said zone of the chamber.

29. A heat transfer apparatus according to claim 27, wherein the additional heat transfer surface is obtained by providing a greater number of fins.

30. A heat transfer apparatus according to claim 26, comprising
- an air preheater chamber extending from said first chamber in a longitudinal direction opposite to said first direction,
- an outlet header adjacent said second chamber at the end of said chamber where said process gas enters said chamber,
- an inlet header connected to said conduit heat transfer means,
- an air preheater coil in said air preheater chamber connected to said inlet header and
- at least one pump in fluid connection between said outlet header and said air preheater coil, whereby the hot fluid exiting from the outlet header of said process gas chamber is pumped into said air preheater coil to preheat the air before it enters said first chamber.

31. A heat transfer apparatus according to claim 1, wherein said means to circulate a heat transfer fluid comprises
- an outlet header,
- a fluid tank in fluid connection with said outlet header,
- at least one pump means in parallel relation and having its inlet in fluid connection with said fluid tank, and
- an inlet header connected to the outlet of said pump.

32. A heat transfer apparatus according to claim 31, further comprising control means to shut down said pumps when abnormal conditions are sensed.

33. A heat transfer apparatus according to claim 32, wherein said control means comprises a pressure sensing means on said fluid tank.

34. A heat transfer apparatus according to claim 32, wherein said control means comprises a temperature sensing means measuring the temperature of the fluid in said tank.

35. A heat transfer apparatus according to claim 32, wherein said control means comprises a low level sensing means monitoring the liquid level in said fluid tank.

36. A heat transfer apparatus according to claim 32, wherein said control means comprises means to monitor the fluid output from the pumps.

37. A heat transfer apparatus according to claim 32, wherein said control means comprises a temperature sensing means measuring the temperature of the hot process gas.

38. A heat transfer apparatus for heating combustion air while cooling a hot process gas close to its dew point comprising
- a first chamber defining a combustion air zone through which air to be heated flows in a first direction along the longitudinal axis of the apparatus;
- a second air chamber adjacent said first chamber means defining a process gas zone through which heated process gas flows in a direction parallel to the longitudinal axis and the same as said first direction;
- a common wall between said two chambers thermally separating said combustion air zone and said process gas zone;
- hollow conduit heat transfer means extending through said common wall and bending back and forth between said two zones to form at least one serpentine coil extending in one direction;
- an inlet header at one end of said serpentine coil;
- an outlet header at the opposite end of said serpentine coil; and
- means to continuously circulate a heat transfer fluid through said inlet header, said heat transfer means between said two zones, and said outlet header, whereby the heat adsorbed by said fluid in the hot process gas zone is transferred to said combustion air.

39. In a heating apparatus having an air inlet section, a heater section, a convection section and a flue gas outlet section, the improvement wherein a heat transfer apparatus is provided for heating the combustion air while cooling the hot flue gas close to its dew point comprising
- a first chamber connected to said air inlet section defining a combustion air zone through which air to be heated flows in the first direction along the longitudinal axis of the heat transfer apparatus;
- a second chamber adjacent said first chamber defining a flue gas zone through which heated flue gas flows in a second direction parallel to the longitudinal axis and opposite to that of said first direction with said second chamber being connected to said flue gas outlet section;
- a common wall between said two chambers thermally separating said combustion air zone and said process gas zone;
- hollow conduit heat transfer means extending through said common wall and bending back and forth between said two zones to form at least one serpentine coil extending in one direction;
- an inlet header at one end of said serpentine coil;
- an outlet header at the opposite end of said serpentine coil; and
- means to continuously circulate a heat transfer fluid through said inlet header, said heat transfer means between said two zones, and said outlet header, whereby the heat adsorbed by said fluid in the hot process gas zone is transferred to said combustion air;
- stack flow means to release said flue gas to the atmosphere; and
- fan means receiving the flue gas from said second chamber and directing the gas up through said stack flow means.

* * * * *